United States Patent
Jenkins et al.

(10) Patent No.: US 6,553,684 B2
(45) Date of Patent: Apr. 29, 2003

(54) AUXILIARY TOOL FOR MEASURING TAPE AND COMBINATION THEREOF

(75) Inventors: Nevin C. Jenkins, 1760 S. Dimensions Ter., Homosassa, FL (US) 34448; Antonio Lebron, 9247 Antrim St., Spring Hill, FL (US) 34608

(73) Assignees: Nevin C. Jenkins, Homosassa, FL (US); part interest; Martin Fleit, Miami, FL (US); part interest; Antonio Lebron, Spring Hill, FL (US); part interest ( * ) Notice: Subject to any disclaimer, the term of this patent is extended or adjusted under 35 U.S.C. 154(b) by 41 days.

(21) Appl. No.: 09/766,369

(22) Filed: Jan. 19, 2001

(65) Prior Publication Data

US 2002/0095814 A1 Jul. 25, 2002

(51) Int. Cl.[7] .................................................. G01B 3/10
(52) U.S. Cl. .............................. 33/770; 33/768; 33/668
(58) Field of Search ........................ 33/759, 760, 770, 33/668, 27.031, 27.032, 41.1, 42

(56) References Cited

U.S. PATENT DOCUMENTS

| | | | | |
|---|---|---|---|---|
| 3,808,692 A | * | 5/1974 | Gartner | 33/759 |
| 4,007,543 A | * | 2/1977 | McClay, Jr. | 33/759 |
| 4,967,482 A | * | 11/1990 | Hoover et al. | 33/42 |
| 5,092,057 A | * | 3/1992 | Hoenig, Sr. | 33/760 |
| 5,113,596 A | * | 5/1992 | Meyers | 33/759 |
| 5,333,391 A | * | 8/1994 | Eldridge et al. | 33/760 |
| 5,848,481 A | * | 12/1998 | Parsons et al. | 33/770 |
| 6,098,303 A | * | 8/2000 | Vogel | 33/759 |
| 6,223,443 B1 | * | 5/2001 | Jacobs | 33/27.03 |

* cited by examiner

Primary Examiner—Diego Gutierrez
Assistant Examiner—Yaritza Guadalupe
(74) Attorney, Agent, or Firm—Martin Fleit; Paul D. Bianco; Fleit Kain Gibbons Gutman & Bongini PL

(57) ABSTRACT

A tool and/or the combination of a spring-biased reel type measuring tape and the tool which serves the purpose of measuring and marking a cut on a board. The tool consists of a bracket attached to the spring-biased reel type measuring tape. An apron is pivotally mounted to the bracket for pivoting to a vertical downward position to serve as a bearing surface against a board to be cut. An elongated measuring bar is pivotally mounted to the bracket for pivoting horizontally from a closed position adjacent the measuring tape to an open position angularly displaced away from the measuring tape to serve as a guide for a marking line on the board to be cut. A carriage is slidably mounted in the on the measuring bar for carrying a marking implement suitable for making a marking line on the board to be cut.

18 Claims, 5 Drawing Sheets

AUXILIARY TOOL FOR MEASURING TAPE AND COMBINATION THEREOF

BACKGROUND OF THE INVENTION

1. Field of Invention

The present invention relates to an auxiliary tool for use with a measuring tape, and the combination of a measuring tape with the novel auxiliary tool.

2. Prior Art

People who use a measuring tape, such as carpenters or do-it-yourselfers, in determining lengths of boards to cut, are required to perform a number of actions, and to use a number of implements. For example, in determining the length of a board to cut, one must first measure with a measuring tape, such as, a spring loaded, reeled metal tape, then mark the cut with a marking implement, such as a carpenter's pencil. Then, place a square consisting of a right angle metal tool, on the marked cut, and using the carpenter's pencil, draw a line across the board, at right angles to the board edge. Alternatively, if the cut is at an angle to the edge of the board, e.g., a 22 ½ degree or 45 degree cut, then, a special tool must be used that will set the angle relative to the marked cut and the board edge. All in all, a number of actions are required and the person performing the work must juggle a number of tools. This poses a problem in keeping track of all the tools or implements that are needed to perform the noted activity, and having them at arm's reach during such activity.

SUMMARY OF THE INVENTION

The present invention provides an auxiliary tool for use in conjunction with a measuring tape, which facilitates the described operations, and provides, directly at hand, the necessary components to effectively perform board cuts at any of a plurality of selected angles. This is accomplished by a tool that can be attached to or integrated with or otherwise married to a reel-type measuring tape without any modification to the tape, and enables the marking of the cut, and the drawing of the cut line by the tool features at hand. In more detail, the tool of the present invention consists of an L-shaped metal bracket that is provided with holes in the vertical leg of the bracket, that match and register with the screw holes of a conventional reel-type measuring tape as commonly used by carpenters. In this manner, the bracket can be attached to the tape with the horizontal leg situated in contact with the bottom of the tape. Pivoted to the horizontal leg is a rule that carries, via a carriage, a marking pencil of the type commonly used by carpenters. The rule can be swung out at any desired angle, at any desired board length, as determined by the tape, and locked in position, whereupon, the marking pencil then can inscribe a cut line on the board. In practice, it is customary to make cuts of 22½, 45, 67½ or 90 degrees, and therefore, the pivot mechanism for the rule is provided with detents or gearing that establish these angles as natural stop points. An apron is hinged to one edge of the horizontal leg that serves as an orientation or indexing or bearing surface for the edge of the board to locate the tool in the proper juxtaposition relative to the board edge on which the measurement is being made. Pins are provided to serve as contacts for the upper surface of the board to maintain correct juxtapositioning.

Accordingly, the tool of the present invention, and/or the combination of the tool and tape, provides the advantages over the known state of the art by enabling measuring and cuts to boards to be made in one integrated operation with all necessary implements to effect the marking of the cut being at hand. These and further advantages of the present invention will become readily apparent from the following detailed description of a preferred embodiment when taken in conjunction with the appended drawings.

DETAILED DESCRIPTION OF A PREFERRED EMBODIMENT

Figure 1:
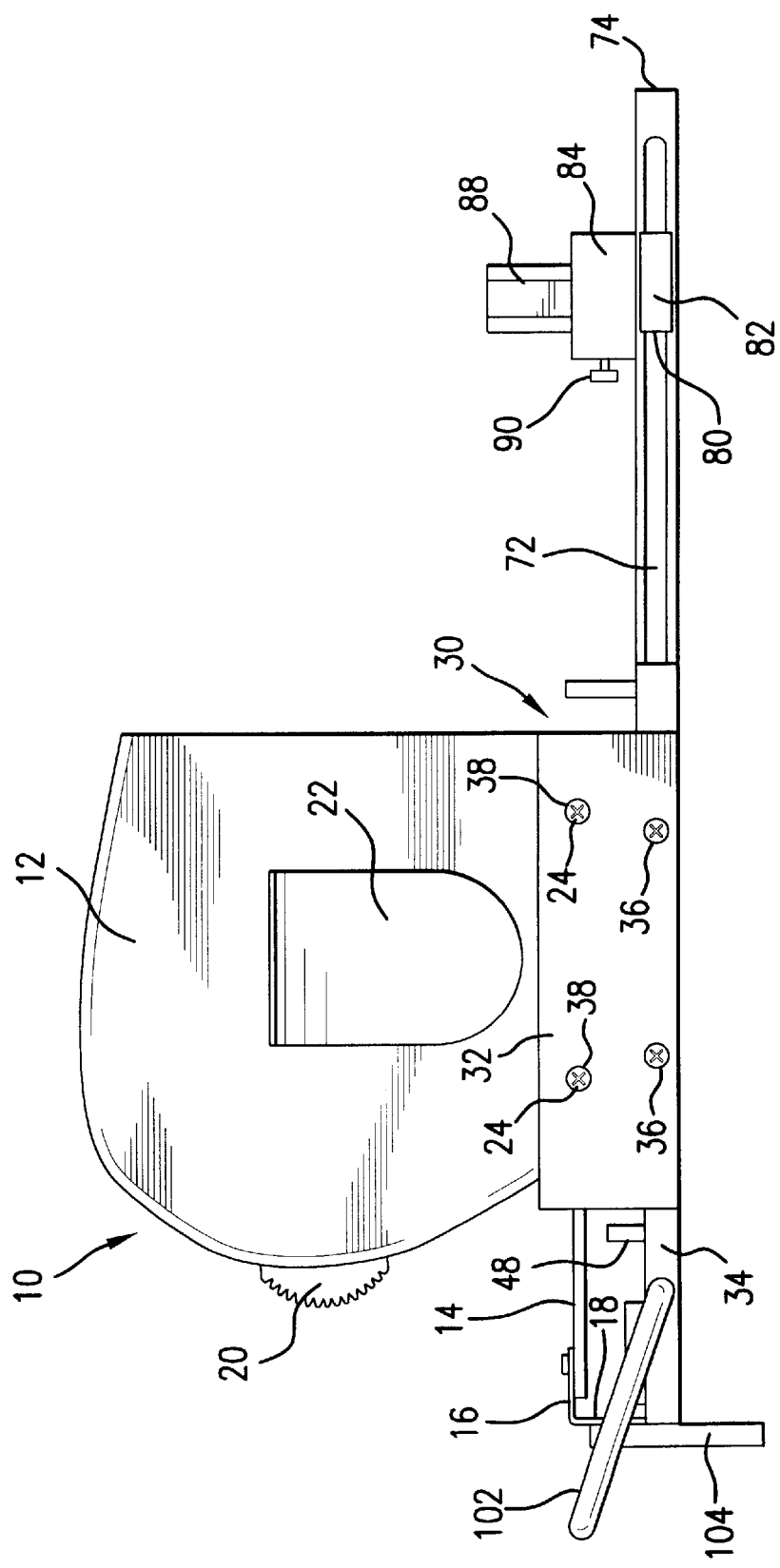
FIG. 1 is a side view of the novel tool of the present invention showing it integrated with a reel-type measuring tape.

Referring now to the drawings, a preferred embodiment of the inventive tool will now be described in detail. In FIG. 1, a measuring tape 10, of the kind used by carpenters for measuring board lengths for cuts, and for other purposes, is integrally connected to the inventive tool. The measuring tape consists of a housing 12 that contains a spring biased reel of metal tape 14 the projecting end of which is provided with a fitting 16 with a depending skirt 18 to enable the end of the tape to be held against the end of a board or the like while the tape is unreeled against the spring bias. A vertical plate 104 can be fixed to skirt 18 to elongate its effect. A lock is provided operated by a knurled projection 20 to enable the metal measuring tape to be held is a fixed unreeled position. The projection is mounted on the front end of the tape housing 12 and slides up (unlocked position) and down (locked position). As normally provided, a pair of screws 24 are included as fasteners that fasten the tape assembly together. Also, the housing 12 is provided with a belt clip 22 on the side of the tape 10 to enable a carpenter to carry it on his belt. Thus far, the description regarding the measuring tape is known technology, and one can find such measuring tapes in every hardware store.

The tool of the present invention consists of an L-shaped bracket 30 comprised of a vertical leg 32 and a horizontal leg 34. The legs may be made integrally or as two separate pieces screwed together. To this end, legs 32 and 34 are illustrated as screwed together by screws 36. The vertical leg 32 is provided with two holes 38 that register with the screws 24 of the tape 10. To mount the tool to the tape, screws 24 are removed from the tape housing 12, and then placed through the holes 38 in the vertical leg 32 and refastened to the tape housing 12 thereby capturing the bracket 30. At this time, the bracket 30 is situated with the vertical leg 32 adjacent the side of the housing 12 on which the clip 22 is mounted, and the horizontal leg 34 is underneath the tape housing 12, contacting the bottom of the tape housing in its medial plane. However it is possible to reverse this arrangement.

Figure 5:
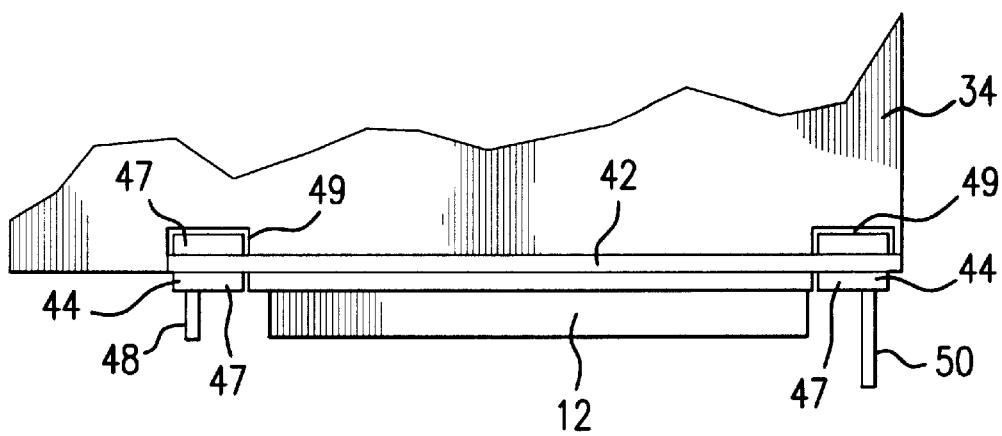
FIG. 5 is fragmentary view of the bottom of the assembly shown in FIG. 1 showing the hinged apron moved to its operative position for engaging a board edge.
Figure 6:
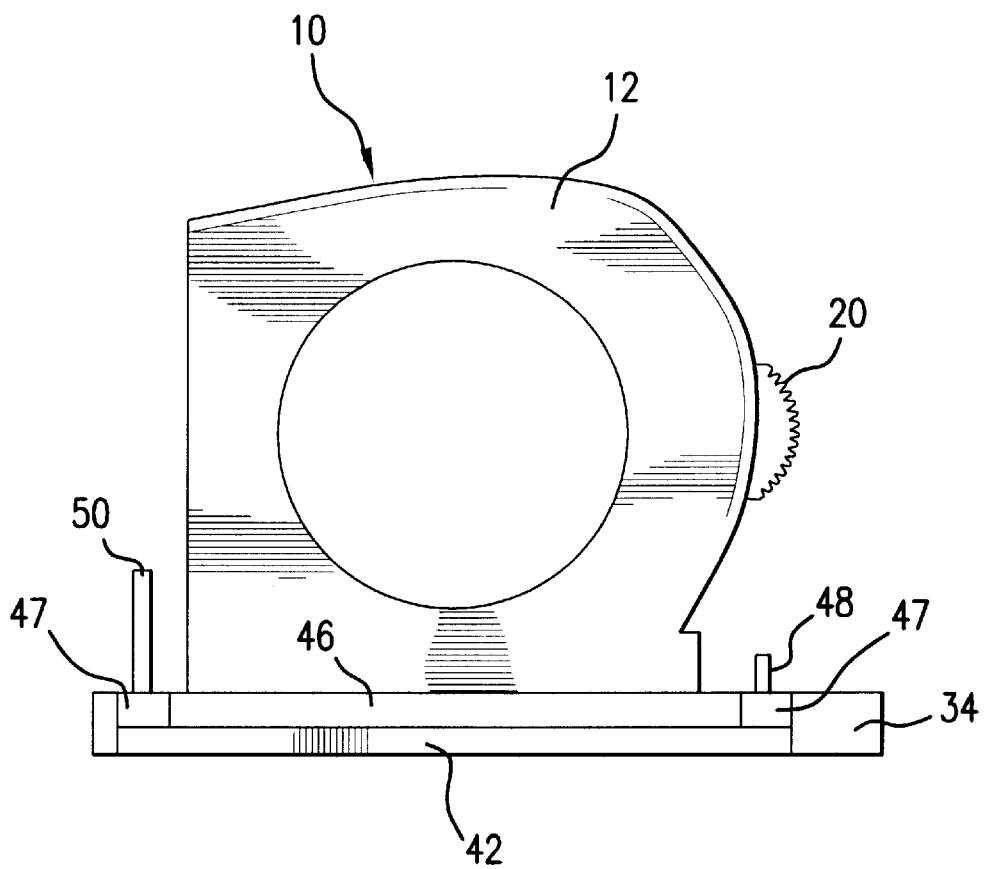
FIG. 6 is a fragmentary view from the side showing the hinged apron and gap between the apron and the bottom of the tape housing.

The horizontal leg 34 has attached to one edge 40 an apron 42 by way of a pair of hinges 44 that permit the apron 42 to either lie horizontally in the plane of the horizontal leg 34 or be pivoted downward to a position at right angles to the horizontal leg 34. Further, the apron 42 has a thickness about half the thickness of the horizontal leg 34 and is fastened in the middle of edge 40 above the bottom surface of the horizontal leg 34 and short of the top surface of horizontal leg 34 leaving a gap 46 between the upper surface of the apron 42 and the bottom of the tape housing 12, see FIG. 6. The hinges 44, formed integral with the apron 42, extend the full thickness of the horizontal leg 34 and therefore, define shoulders 47 above the top surface and below the bottom surface of the apron 42. The hinge pins 45 for the hinges 44 are set into cutouts 49 defined in the horizontal leg 34. Mounted on the top surfaces of the hinges 44 are a front vertical pin 48 and a longer rear pin 50. When the apron 42 is pivoted via hinges 44 from its horizontal position to its vertical downward position, as depicted in FIG. 5, a view taken from the bottom, one sees the shoulders 47 with the pins 48 and 50 now extending horizontally. The top surface of apron 42 is now vertical and is placed against a board edge with the shoulders 47 and the pins 48 and 50 extending over or overlying the upper surface of the board to index the tool relative to a board and its edge. The top surface of apron 42 is a bearing surface and shoulders 47 and pins 48 and 50 are bearing contacts.

Figure 2:
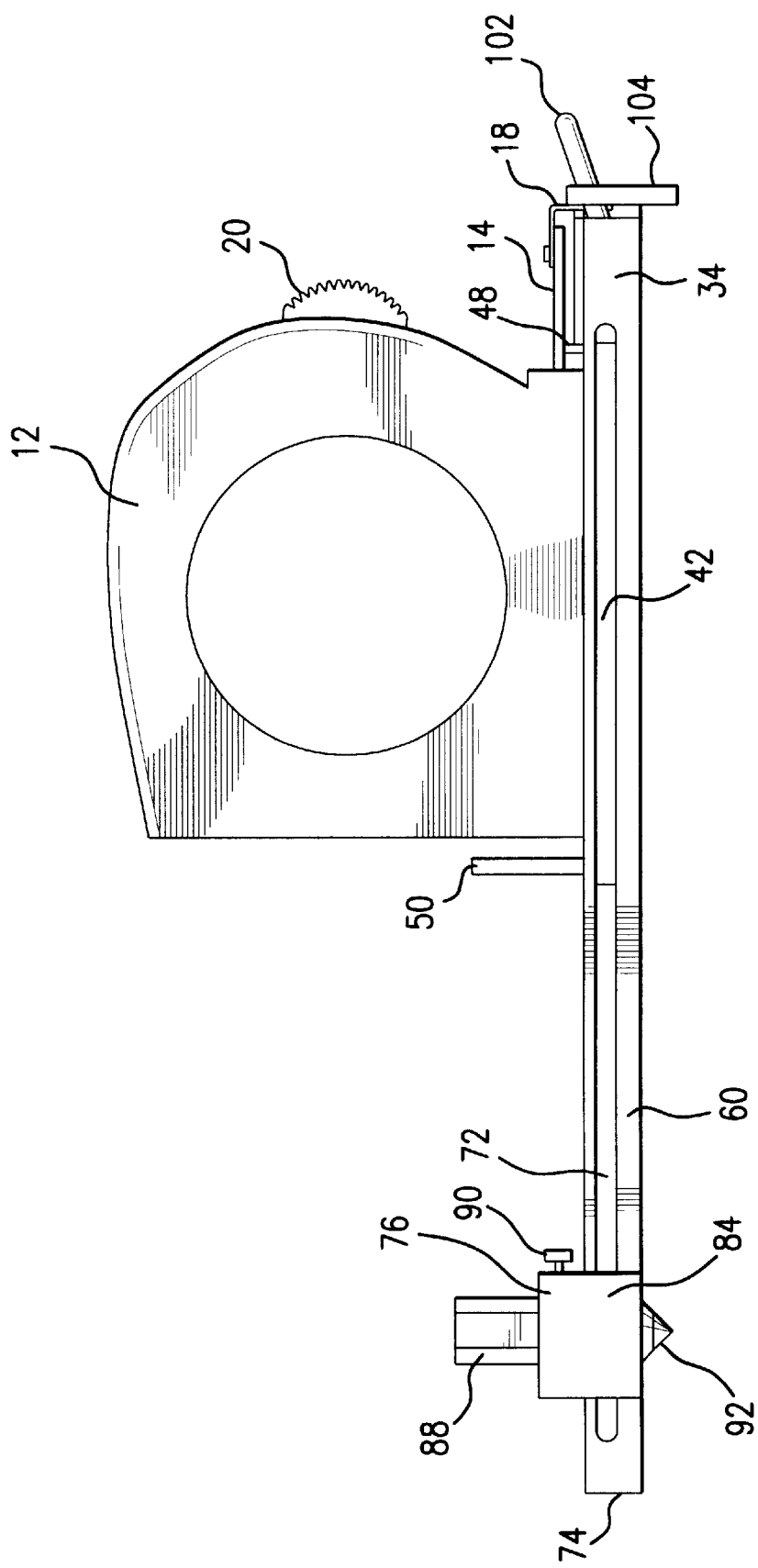
FIG. 2 is a view from the opposite side of the assembly shown in FIG. 1.
Figure 3:
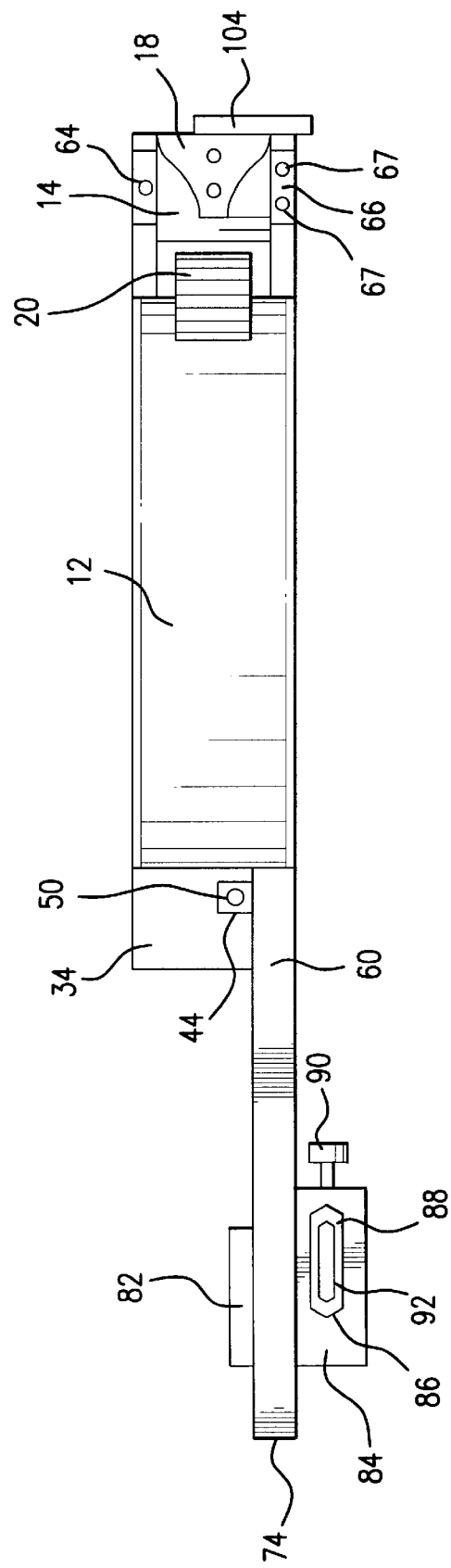
FIG. 3 is top view of the assembly shown in FIG. 1.
Figure 4:
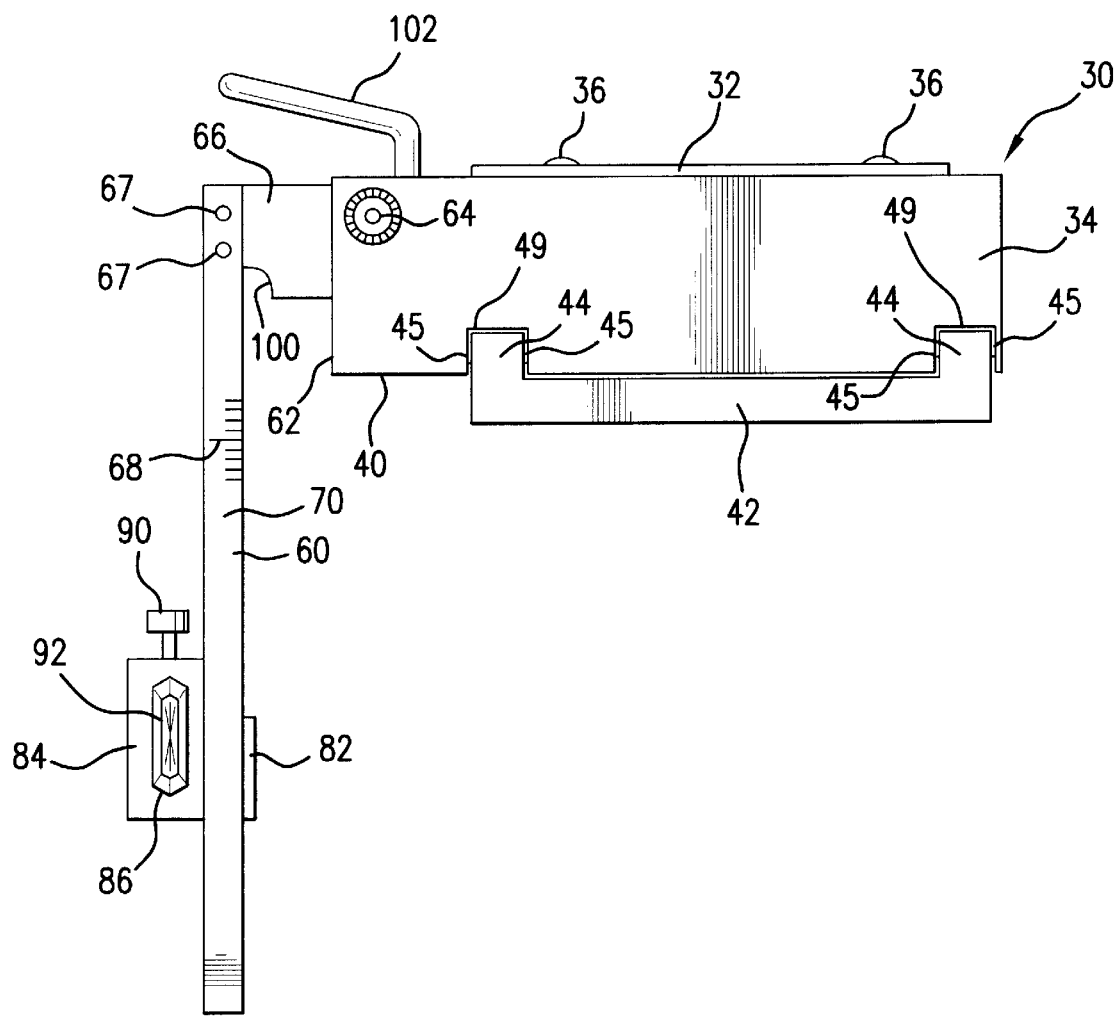
FIG. 4 is a bottom view of the assembly shown in FIG. 1.

An elongated rule 60, on the same side as apron 42, is pivotally attached to one side of the forward end 62 of horizontal leg 34 via one end of a plate 66 attached at a right angle to one end of rule 60 by rivets 67. Plate 66 is mounted at its other end to the other side of forward end 62 of horizontal leg 34 by a pivot pin 64. The rule 60 pivots from a closed position adjacent to the horizontal leg 34, as shown in FIGS. 1 and 2, to an open position at right angles to horizontal leg 34, i.e. 90 degrees, as shown in FIG. 4. Rule 60 is an elongated metal bar approximately 6 inches in length and has suitable indicia 68 inscribed on its upper surface 70 that define inches and fractions of inches (or metric), like what one sees on the measuring tape. Rule 60 defines a horizontal through slot 72 which extends from adjacent the end of rule attached to horizontal leg 34 to adjacent its free end 74. A plastic carriage 76 is mounted in slot 72 for sliding movement. Carriage consists of a unitary plastic piece that has a reduced section 80 that is received in slot 72, a slightly enlarged end section 82 on one side, and a greatly enlarged section 84 on the other side. Sections 82 and 84 hold the carriage in the slot 72. Section 84 defines a through hole 86 of generally oval or racetrack shape in which a carpenter's pencil 88 can be inserted. A conventional thumbscrew 90 is mounted in the side of section 84, and serves to hold pencil 88 in a fixed position with the writing end 92 of the pencil 88 projecting downwardly for marking. The slot 72 is sized and dimensioned to be able to receive within the slot, the apron 42. With the apron 42 horizontal and an extension of and in alignment with horizontal leg 34, the rule can be pivoted to the closed position whereat it receives the apron 42 in slot 72 with the upper portion of the bar or rule 60 being received in the gap 46 and the lower portion of the rule 60 underlying the apron 42. This is the closed position as shown in FIGS. 1 and 2. The plate 66 is provided with a cutout 100 so that when rule 60 is pivoted into the closed position, the cutout 100 receives the pin 48. Alternatively, plate 66 can be suitably profiled to accommodate the pin 48 by allowing suitable clearance. Also, the pivot pin 64 cooperates with a gear wheel 106 that is controlled by a lever 102 mounted in the side of the horizontal leg 34 which serves as a lock. Lever 102 is preferably threaded in a bore and cooperates with the gear wheel 106 to allow free rotation or inhibit rotation, so that the lever can be rotated to assume one of two positions, namely, unlocked and locked. The details of this mechanism are known and conventional. However, imposed on this conventional mechanism is a series of sensed stops or detents (not shown) indicative of angles of the rule of 22½, 45, 67½ and 90 degrees. When a desired sensed angle (stop) is felt, as the rule 60 is rotated, the lever 102 can readily be manipulated to lock the rule 60 in place whereupon the carriage can be moved relative to a board to effect a marking or cut line.

The novel tool of the present invention is used as follows. The tool is mounted in combination with a measuring tape in the manner described using screws 24. The tape is then used in normal fashion to measure a desired board length, and in doing so, the tape 14 is drawn out of housing 12 being unreeled under bias and is locked using the projection 20. At this time, the rule 60 is unlocked by the lever 102 and rotated to the appropriate angle, freeing the apron 42 to be rotated downward to the vertical. The combination of the tape and the tool is now placed against the board edge with the upper surface of the apron, now vertical, resting or bearing against the board edge, and the pins 48 and 50 and shoulders 47 bearing against the upper surface of the board. The outboard edge of rule 60 is the marking line, and is set at the correct measurement location relative to the tape 14, at the selected angle, and locked by the lever 102. Next the carriage 84 is manipulated to slide in slot 72 so that the working end or point of pencil 90, the marking implement, contacts the upper surface of the board and marks a graphite line on the board indicative of the location of the desired cut at the correctly measured length and at the correctly selected angle.

Although the invention has been described with respect to a preferred embodiment, this is by way of a specific example of the invention for the purpose of teaching how to make and use at least one specific embodiment, and not by way of limitation. Changes and modifications will be evident to those skilled in the art that do not depart from the teachings, spirit and scope of the invention as expressed in the appended claims. Such changes and modifications are deemed to fall within the purview of the invention as set forth in the appended claims.

What is claimed is:

1. A tool comprising
   a bracket for attaching the tool to a spring-biased reel type measuring tape,
   an element pivotally mounted to the bracket for pivoting to a vertical downward position to serve as a bearing surface,
   a member pivotally mounted to the bracket for pivoting horizontally from a closed position adjacent the measuring tape to an open position angularly displaced away from the measuring tape to serve as a guide for a marking line,
   a carriage slidably mounted in the member for carrying a marking implement suitable for making a marking line; and
   wherein the member is elongated and pivots from a closed position where it houses the element to an open position where the element is free to pivot.

2. A tool according to claim 1 wherein the bracket is L-shaped.

3. A tool according to claim 1 wherein the element is an apron that is hinged to the bracket.

4. A tool according to claim 1 wherein the elongated member defines a horizontal slot in which the carriage is mounted.

5. A tool according to claim 1 wherein the carriage is provided with a through hole for receiving a marking implement.

6. A tool according to claim 5 wherein a settable lock is mounted in the carriage for locking the marking implement in the through hole.

7. A tool according to claim 1 wherein the member is rotatable relative to the bracket to a plurality of stopped angular positions.

8. A tool according to claim 1 wherein a lock is provided for the member to enable the member to be pivoted to an angular position relative to the bracket and then be locked.

9. A tool comprising:
- a bracket for attaching the tool to a spring-biased reel type measuring tape;
- an element pivotally mounted to the bracket for pivoting to a vertical downward position to serve as a bearing surface;
- a member pivotally mounted to the bracket for pivoting horizontally from a closed position adjacent the measuring tape to an open position angularly displaced away from the measuring tape to serve as a guide for a marking line;
- a carriage slidably mounted in the member for carrying a marking implement suitable for making a marking line; and
- wherein guide pins are mounted on the element to present a bearing contact at right angles to the bearing surface presented by the element.

10. The combination of a spring-biased reel type measuring tape and a tool, the tool comprising
- a bracket for attached to the spring-biased reel type measuring tape,
- an element pivotally mounted to the bracket for pivoting to a vertical downward position to serve as a bearing surface,
- a member pivotally mounted to the bracket for pivoting horizontally from a closed position adjacent the measuring tape to an open position angularly displaced away from the measuring tape to serve as a guide for a marking line,
- a carriage slidably mounted in the member for carrying a marking implement suitable for making a marking line; and
- wherein the member is elongated and pivots from a closed position where it houses the element to an open position where the element is free to pivot.

11. The combination of a spring-biased reel type measuring tape and a tool according to claim 10 wherein the bracket is L-shaped.

12. The combination of a spring-biased reel type measuring tape and a tool according to claim 10 wherein the element is an apron that is hinged to the bracket.

13. The combination of a spring-biased reel type measuring tape and a tool according to claim 10 wherein the elongated member defines a horizontal slot in which the carriage is mounted.

14. The combination of a spring-biased reel type measuring tape and a tool according to claim 10 wherein the carriage is provided with a through hole for receiving a marking implement.

15. The combination of a spring-biased reel type measuring tape and a tool according to claim 14 wherein a settable lock is mounted in the carriage for locking the marking implement in the through hole.

16. The combination of a spring-biased reel type measuring tape and a tool according to claim 10 wherein the member is rotatable relative to the bracket to a plurality of stopped angular positions.

17. The combination of a spring-biased reel type measuring tape and a tool according to claim 10 wherein a lock is provided for the member to enable the member to be pivoted to an angular position relative to the bracket and then be locked.

18. The combination of a spring-biased reel type measuring tape and a tool comprising:
- a bracket for attached to the spring-biased reel type measuring tape;
- an element pivotally mounted to the bracket for pivoting to a vertical downward position to serve as a bearing surface;
- a member pivotally mounted to the bracket for pivoting horizontally from a closed position adjacent the measuring tape to an open position angularly displaced away from the measuring tape to serve as a guide for a marking line;
- a carriage slidably mounted in the member for carrying a marking implement suitable for making a marking line; and
- wherein guide pins are mounted on the element to present a bearing contact at right angles to the bearing surface presented by the element.

* * * * *